United States Patent [19]
Todd et al.

[11] Patent Number: 6,156,204
[45] Date of Patent: Dec. 5, 2000

[54] WASTE WATER TREATMENT, MEDIA THEREFOR AND ITS MANUFACTURE

[75] Inventors: John James Todd, 61 Sandy Lane, Hartley Wintney Hampshire RG27 8BT; Adrian Hopwood, Wantage, both of United Kingdom

[73] Assignees: Proceff Limited; John James Todd, both of United Kingdom

[21] Appl. No.: 09/337,990

[22] Filed: Jun. 22, 1999

Related U.S. Application Data

[62] Division of application No. 08/894,077, filed as application No. PCT/GB96/00335, Feb. 13, 1996, Pat. No. 5,948,262.

[30] Foreign Application Priority Data

Feb. 13, 1995 [GB] United Kingdom .................... 9502743
Nov. 17, 1995 [GB] United Kingdom .................... 9523626

[51] Int. Cl.$^7$ ........................................................ C02F 3/00
[52] U.S. Cl. ........................ 210/616; 210/617; 210/150; 428/404; 428/407
[58] Field of Search ............................... 210/616, 617, 210/618, 150, 157; 428/403, 404, 407; 427/198, 199, 201, 204, 222, 314, 336, 333; 264/117, 131

[56] References Cited

U.S. PATENT DOCUMENTS

| | | | |
|---|---|---|---|
| 3,864,443 | 2/1975 | Hopkins ................................... | 264/131 |
| 4,243,696 | 1/1981 | Toth ........................................ | 427/201 |
| 4,576,718 | 3/1986 | Reischl et al. .......................... | 210/151 |
| 4,620,931 | 11/1986 | Hirata et al. ............................. | 210/150 |
| 4,983,299 | 1/1991 | Lupton et al. ........................... | 210/150 |
| 5,126,042 | 6/1992 | Malone .................................... | 210/616 |
| 5,166,072 | 11/1992 | Krauling et al. ........................ | 210/151 |
| 5,458,779 | 10/1995 | Odeguard ................................ | 210/150 |
| 5,486,292 | 1/1996 | Bair et al. ................................ | 210/618 |
| 5,569,634 | 10/1996 | Miller et al. ............................. | 210/617 |

FOREIGN PATENT DOCUMENTS

| | | |
|---|---|---|
| 324314 | 7/1989 | European Pat. Off. . |
| 2725510 | 12/1977 | Germany . |
| 63-007897 | 1/1988 | Japan . |
| 663782 | 1/1988 | Switzerland . |
| 1579623 | 11/1980 | United Kingdom . |
| WO 95/17351 | 6/1995 | WIPO . |

*Primary Examiner*—Christopher Upton
*Attorney, Agent, or Firm*—Klauber & Jackson

[57] ABSTRACT

Granules of plastics material have grains of an inert mineral such as sand coated thereon to provide a habitat for microorganisms effective in waste water treatment, the granules having a predetermined particle size range, and the grains having a predetermined particle size range and being disposed at a predetermined packing density range on the granules. The particles have an average density of approximately 1.0 g/cc such that a proportion tend to float and a proportion tend to sink in the waste water. The particles are manufactured by contacting the granules of plastics material with a mixture of grains of the inert mineral and grains of a soluble substance such as salt, at an elevated temperature, to coat the granules with the mixture, and subsequently dissolving the soluble substance grains from the coating to provide the granules coated with the grains of inert mineral in the predetermined packing density range.

8 Claims, 1 Drawing Sheet

WASTE WATER TREATMENT, MEDIA THEREFOR AND ITS MANUFACTURE

This Application is a Division, of application Ser. No. 08/894,077, filed Aug. 12, 1997 U.S. Pat. No. 5,948,262, which is a 371 of PCT/GB96/00335 filed Feb. 13, 1996.

TECHNICAL FIELD

This invention relates to loose particulate material for use in waste water treatment plant and methods, to the manufacture of such material, and to methods and apparatus for the treatment of waste water using such material.

BACKGROUND ART

Waste water may be treated by gasification, for example by the aeration or oxygenation of sewage or other waste water containing organic matter degradable by the action of oxygen thereon. A wide range of treatment methods and apparatus has been used and proposed. Oxygen does not dissolve easily or quickly in water and it is therefore in principle desirable to utilize fine bubble aerators wherein the bubbles are less than 2 mm and desirably less than 1 mm in diameter. Smaller bubbles have a larger specific surface area for oxygen transfer into the liquid, and also rise more slowly through the liquid to give a longer time for the oxygen to transfer before the bubble reaches the liquids surface. Treatment plants are known comprising a treatment vessel with aerator devices submerged in the waste water to produce the bubbles.

It has also been proposed to provide a treatment plant where the treatment vessel contains a bed of loose material. Aeration then causes a degree of fluidization of the bed and sustains the growth of a population of microorganisms on the material of the bed. In the presence of dissolved oxygen the microorganisms convert the organic matter in the waste water to carbon dioxide, water and to more bulky cellular materials and sludge thus alleviating the biological oxygen demand (BOD). Under appropriate operating conditions they will also convert ammonia to nitrate compounds. The surplus sludge thus formed can pass out with the effluent for eventual separation and recycling if desired.

Problems of fouling and clogging of the aerator devices and any pipe work can be acute where they are buried or caged beneath a bed of loose material. Regular closing and draining of the plant for cleaning and unblocking or replacement of the aerators is inefficient and expensive due to the need also to move aside or remove the filter bed material to gain access to the buried aerators.

Our Application no. PCT/GB94/02795 (now publication WO/95/17351) describes a method and apparatus for treatment of waste water wherein such problems are mitigated, and in particular discloses loose particulate material for use as a fluidizable bed in the waste water treatment, said material being characterized by particles of a substantially inert mineral adhered to, coated on or coated by plastics material to provide a habitat for microorganisms effective in waste water treatment.

That Application also discloses a waste water treatment method characterized by allowing waste water to enter a treatment vessel containing a bed of such loose particulate material, and gasifying the bed and the waste water by means of gas bubbles emitted from one or more gasifiers disposed within the bed and adapted for placement and removal from above the water level.

That Application also discloses apparatus for treatment of waste water characterized by a treatment vessel containing a bed of such loose particulate material, one or more gasifiers movably disposed within the bed, and means for supplying gas to the gasifiers for emission as gas bubbles to gasify the bed and the waste water, said gasifiers being adapted for placement and removal from above the water level.

That Application discloses such loose particulate material having a density in the range of from substantially 1.0 to substantially 1.3 g/cc, having a specific surface area in excess of approximately 600 $m^2$ per cubic meter of the loose material, and having a particle size range of substantially 3 mm to substantially 10 mm in diameter. An example of the material is disclosed as particles of sand or gravel or other inert mineral particles at least partially adhered to, coated on or coated by plastics material, preferably a thermoplastics material such as polyethylene. It was disclosed that the material could be produced to a desired density for a particular application by changing the initial proportions of mineral and plastics. The particles may be formed by partially melting the polyethylene, for example in hot air, and allowing it to contact the sand or gravel. In use, the particles are quite loose and readily permit the gasifiers to be shaken down through the bed and placed where desired on the base of the vessel. No surrounding cage, grid or mesh was required.

Such loose particulate material has been found in practice to be effective for use as a fluidizable bed in waste water treatment by such methods and apparatus. Such materials have been found to provide a particularly suitable habitat for a high population density of microorganisms of the type effective in waste water treatment.

DISCLOSURE OF INVENTION

It has been found, however, that particularly effective and efficient treatment can be obtained for a given plant and treatment requirements if the physical characteristics of the loose particulate material are specified and controlled to suit the requirements. An object of the present invention is to provide such loose particulate material and to provide methods for its manufacture.

According to the present invention there is provided a loose particulate material for use in waste water treatment, said material characterized by granules of plastics material each having a plurality of grains of a substantially inert mineral coated thereon to provide a habitat for microorganisms effective in waste water treatment, said granules having a predetermined particle size range, and said grains having a predetermined particle size range and being disposed at a predetermined packing density range on the granules.

The loose particulate material may be regarded as a fluidizable bed. Substantial trials of such fluidizable beds in practice have however shown that certain problems can arise probably as a natural consequence of the achieved higher population density and therefore compactness of the plant for a given incoming waste water load.

Thus, according to a further aspect of the present invention there is provided loose particulate material for use in waste water treatment, said material being characterized by granules of plastics material each having a plurality of grains of a substantially inert mineral coated thereon to provide a habitat for microorganisms effective in waste water treatment, said granules having a predetermined particle size range, said grains having a predetermined particle size range and being disposed at a predetermined packing density range on the granules, and the particles of said loose particulate material having an average density of approximately 1.0 g/cc such that a proportion of the particles tend to float and a proportion tend to sink in waste water to be treated.

The material is preferably such that about 50% of the particles tend to float at the surface of a body of waste water to be treated and about 50% tend to sink upon initial charging and when the body of waste water is at rest. Upon commencing aeration, it is found that the particles mix very rapidly into a vigorous circulation pattern with minimum energy input requirements and highly efficient aeration.

The invention also provides waste water treatment plants and methods using such loose particulate materials.

The invention further provides a method of manufacture of loose particulate material for use in waste water treatment, said method comprising contacting the granules of plastics material of a predetermined particle size range with a mixture of grains of a substantially inert mineral of a predetermined particle size range and grains of a soluble substance of a predetermined particle size range, at an elevated temperature, to coat the granules with the mixture, and subsequently dissolving the soluble substance grains from the coating to provide granules coated with said grains of substantially inert mineral in a predetermined packing density range.

It has been found that efficient and effective waste water treatment requires loose particulate material of a predetermined particle size range, according to the treatment requirements for that waste water. This is governed by the particle size range of the plastics material granules, typically 3 to 10 mm considered as a sieve size range and bearing in mind the generally irregular shape of such granules as commercially available. The preferred size range is 4 to 8 mm, more preferably about 4 to 6 mm. A suitable source of supply of said granules is commercially available recycled chips of plastics material, preferably granulated from moulded rejects such as plastics boxes.

It is then generally desired to achieve a high specific surface area for the loose particulate material, for example in excess of about 600 m$^2$ per cubic meter. The greater the specific surface area, the correspondingly larger is the habitat area for the microorganisms effective in the treatment. It would be appreciated that a larger number of smaller grains of the mineral will provide a higher specific surface area, and hence it is generally desirable to select a fairly small grain size for the mineral, for example from about 0.1 to 3.5 mm, preferably 0.1 to 2.5 mm but again depending on the requirements for the specific waste water treatment.

The specific gravity of the plastics material is fixed by the choice of plastics material, suitably polyethylene, and is less than 1.0 g/cc. Likewise the specific gravity of the mineral is fixed by the choice of mineral, suitably sharp sand, and is substantially greater than 1.0 g/cc. Accordingly the resultant specific gravity of the loose particulate material is inevitably determined by the initial choices of particle size for the plastics material and for the mineral. The surface area of the plastics material granule increases only as the square of its diameter while its volume increases as the cube of its diameter. The thickness and therefore effective volume of the mineral coating thereon depends on the diameter of the mineral grains over a given plastics material granule surface area.

Therefore an initial choice of particle size ranges for a given plastics material and given mineral constrains the specific gravity of the resultant particles to a predetermined value. That value may not be desirable. In practice, if the specific gravity is substantially in excess of 1.0 g/cc then the particles may in use remain undesirably compacted as a bed at the base of the treatment vessel and not fully circulate with the waste water circulation pattern induced by the aerator bubble stream. In this context it is assumed that the specific gravity of the waste water is normally close to 1.0 g/cc. If the specific gravity of the particles is less than 1.0 g/cc then the particles may in use remain undesirably concentrated in a floating mass at the top of the treatment vessel and again not circulate as desired.

It is generally desirable for effective waste water treatment that the large majority of the fluidized bed particles circulate reasonably vigorously in the waste water circulation pattern induced by the aeration. The achievement of the present invention is to permit provision of loose particulate material having a specific gravity in accordance with a desired predetermined value, and depending on parameters of the waste water being treated and the treatment plant itself, particularly its horizontal and water depth dimensions.

The invention thus permits the manufacture of the loose particulate material wherein it is reasonably possible to predetermine not only the desired particle size ranges of the plastics material granules and the mineral grains thereon, but also the specific gravity of the finished material. This is achieved by appreciating that it is possible to control the effective packing density of the mineral grains in the coating on the plastics material granules.

BRIEF DESCRIPTION OF THE DRAWINGS

An embodiment of the invention will now be described, by way of example, with reference to the accompanying drawings, in which.

MODES FOR CARRYING OUT THE INVENTION

Figure 1:
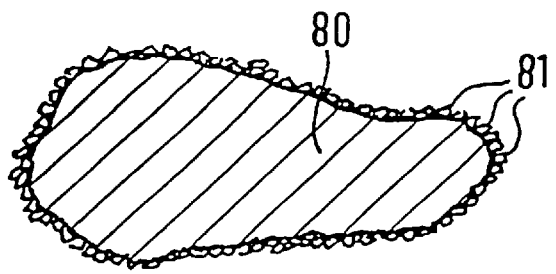
FIG. 1 is a cross-section through a particle of material having a substantially uniform coating.
Figure 3:
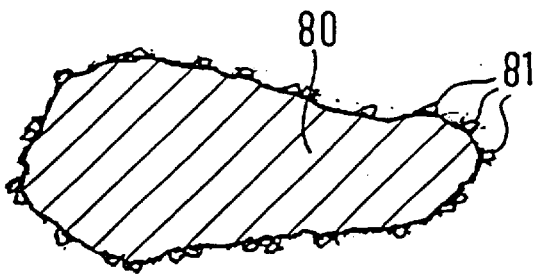
FIG. 3 is a cross-section through a particle having a different controlled coating packing density.

FIG. 1 reproduces FIG. 3 of our above-mentioned WO/95/17351. It shows a granule 80 of polyethylene having a large plurality of grains 81 of sharp sand adhered thereto as a coating by partial melting so as partially to embed the grains on the granules.

Figure 2:
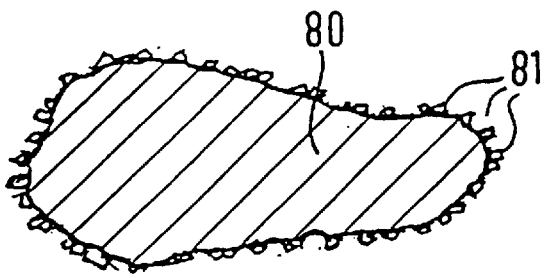
FIG. 2 is a cross-section through a particle having a controlled coating packing density.

FIG. 2 shows a similar granule 80 having a coating of grains of sharp sand of controlled reduced packing density, so as to provide a particle of predetermined desired specific gravity, and FIG. 3 shows a similar granule 80 having a controlled and lesser coating packing density to provide a particle of predetermined lesser desired specific gravity.

The particles of FIGS. 2 and 3 can be manufactured as follows. The particle size ranges for the plastics material granules and the sand grains are selected, usually in accordance with the waste water treatment process and plant requirements. The mineral grains, e.g. sharp sand, are intimately mixed in a chosen proportion, for example 50:50, with grains of a soluble substance also of a predetermined particle size range. The soluble substance may be common salt, i.e. sodium chloride. The particle size range of ordinary table salt is about 0.15 mm and of ordinary water softening salt about 3.3 mm.

The plastics material granules are heated until they partially melt, i.e. the surface becomes shiny and tacky. They are then allowed to contact the mineral mixture, for example by being rolled in a tray of the mixture. Each granule is thereby coated with an adhered coating of the mixture. The coated granules are then washed with cold water, preferably while they are still warm. The soluble salt grains dissolve away in the water leaving the granules coated substantially solely with the grains of sharp sand. The wash water can then be treated to remove the dissolved salt and may be disposed of for another use or may be recycled.

The soluble substance may be any economically available granular substance which is soluble in a common solvent, such as water, that does not affect the plastics material or the sand, and provided that it has a melting point higher than the softening point of the polyethylene granules, i.e. higher than about 200° C.

The packing density can be controlled by selection of the particle size range of the soluble substance grains in relation to the particle size range of the sand grains. FIG. 2 shows the resultant particle when the size ranges are substantially identical, e.g. each about 0.25 mm on an 8 mm plastics material granule. FIG. 3 shows the resultant particle when the salt grains were about three times the diameter of the sand grains, e.g. 0.5 mm salt grains and 0.15 mm sand grains.

In a preferred embodiment, the packing density is controlled by varying the initial proportions of sand to salt grains in the mixture, and it will be appreciated that this has a similar effect to varying the respective particle size ranges. Thus FIG. 3 can equally be taken to show the resultant particle when the initial mixture contained a ratio of about 1:3 of sand to salt grains of substantially the same grain size. Both the initial proportions and the respective grain sizes can be independently varied. An advantage of controlling the packing density by using sand and salt grains of substantially the same grain size and varying their initial proportions in the mixture, is that it simplifies the production of a thorough mixture of the sand and salt grains.

The invention thus permits the manufacture of particles of a desired specific gravity for a particular treatment method and plant, and also particles with a desired specific surface area, e.g. in the range 300 m$^2$ per cubic meter to 600 m$^2$ per cubic meter, for a particular treatment method and plant. This further enables the initial charging of a plant with particles having graded properties. For example a fluidized bed might be created as a layered composite with loose particulate material of relatively higher density at the base and lower density at the top with perhaps also an intermediate layer of intermediate density. In use the denser particles would circulate slowly primarily in the depths of the vessel for initial coarse aeration and a degree of filtration, with the lighter particles circulating more vigorously primarily in the upper levels to complete aeration of the waste water. Slightly different microorganism populations could develop at the different levels with beneficial consequences for the water treatment.

In another embodiment the particles are prepared for a particular plant such that a proportion, for example about 50%, tend to float and a proportion, for example about 50%, tend to sink upon initial charging and when the waste water is at rest.

The inventors have been surprised to find that the use of such light, i.e. low density, material has led to unexpected advantages. Not only is the efficiency of the waste water treatment maintained at a high level, but this is now coupled with simplicity and ease of maintenance of the plant. It is believed that this may be due to breaking away from the previous tendency in the art to consider the particulate material as a fluidizable bed, with the consequent implication that the material should settle down as a bed on the base of the treatment vessel when the aerators are turned off, and hence the particles should have a density greater than 1.0 g/cc. This was at least partly because it was regarded as necessary for the bed particles to have a filtration function.

It is now found that the treatment method is improved by maintaining the media particles continually mobile within and substantially throughout the body of waste water within the treatment vessel, i.e. the particles should have the above-mentioned average density of approximately 1.0 g/cc such that a proportion of the particles tend to float and a proportion tend to sink in the waste water, with a number suspended in the body. In consequence, during aeration by the gasifiers, the particles readily become continually mobile throughout the vessel. This ensures high efficiency of contact between the air, the microorganisms and their food particles in the waste water being treated. Moreover, the mobile particles enhance oxygen transfer by impeding the progress of the bubbles up towards the surface. When a bubble impinges on a particle it will either break up into smaller bubbles or at least slow down as it moves around the rough surface of the particle.

The method is found to be highly stable in that a sufficient population of microorganisms adhere to the suspended media particles at all times, neither too many nor too few being retained over a period of time as the inevitable widely varying quantities of waste water input are received by and flow through the treatment vessel. This achieves the longer term stability that plant operators require, particularly for unattended plants, and leads to the above-mentioned simplicity and ease of maintenance.

Because the average density of the particles is effectively the same as that of the waste water, i.e. they have neutral buoyancy, the energy requirement for aeration and circulation is minimized. It will be appreciated that energization of the aerators not only achieves aeration of the waste water but also drives the circulation pattern within the treatment vessel, as described in our published International Patent Application No. WO 95/17351. The present media particles are well adapted for effective use in such treatment plant and methods as described in that published Application.

The efficiency in treatment by the suspended and circulated microorganisms on the particles, and the efficiency in energy utilization can lead to a very high load factor and thus a smaller plant for a given load, but still coupled with stability of operation, simplicity and ease of maintenance.

Because of the efficiency, the treatment vessel can be charged as low as 20% of its volume with the particulate material, as compared with 60 to 80% by volume with certain bulky prior art treatment media.

The particles can be made by contacting the granules of plastics material of a predetermined particle size range with a mixture of grains of a substantially inert mineral of a predetermined particle size range and grains of a soluble substance of a predetermined particle size range (suitably the same as that of the inert mineral), at an elevated temperature, to coat the granules with the mixture, and subsequently dissolving the soluble substance grains from the coating to provide granules coated with said grains of substantially inert mineral in a predetermined packing density range.

The mineral is suitably silver sand, also known as washed sand or playpit sand, and is characterized by having a high percentage of grains of fairly uniform size.

With prior knowledge of the densities of the plastics material and of the inert mineral, it is therefore readily possible to select the packing density range to achieve the desired average density of approximately 1.0 g/cc.

Moreover, the contact conditions between the granules and the mixture of grains, and the elevated contact temperature, can be adjusted such that the grains coat the granules by burying themselves significantly into the partially melted outer surface of the granules. Thus the grains may have about 50% of their volume buried and the other 50% exposed proud of the surface, so as to retain them securely in position on the granules during their subsequent use in waste water treatment.

The inventors have also found that, by using such significantly buried grains, the subsequent step of dissolving away the soluble substance grains leaves concavities in the surface of the granules having quite comparable overall surface areas to that of the adjacent convexities of the retained insoluble inert material grains. This gives the important technical advantage that the specific surface area of the loose particulate material particles is essentially independent of the initial proportions of numbers of grains of inert material and numbers of grains of soluble substance.

Accordingly the initial proportions may be selected over a wide range, for example from 1:1 up to 8:1 or even higher of salt:sand, without compromising the high specific surface area, for example in excess of about 600 m$^2$ per cubic meter as mentioned above.

It will be appreciated that a large number of smaller grains will provide a higher specific surface area, but the advantage of using significantly buried grains is that the grain size can be selected for a particular specific surface area independent of selection of the ratio of salt:sand. The invention has thus achieved loose particulate material optimally adapted for efficient and effective waste water treatment.

What is claimed is:

1. Particulate material for use in waste water treatment, comprising solid granules of plastics material, each solid granule having a plurality of grains of a substantially inert material coated thereon to provide a habitat for microorganisms effective in waste water treatment, said solid granules having a predetermined particle size range, said grains having a predetermined particle size range and being disposed at a predetermined packing density range on the granules, the particulate matter having an average density of approximately 1.0 g/cc such that about 50% of the particles tend to float at the surface of a body of waste water to be treated and about 50% tend to sink upon initial charging and when the body of waste water is at rest.

2. Material according to claim 1 having a specific surface area in excess of approximately 600 m$^2$ per cubic meter of the material.

3. Material according to claim 1 having a particle size range of substantially 4 mm to substantially 6 mm in diameter.

4. Material according to claim 1 wherein the substantially inert material comprises sand and the plastics material comprises polypropylene.

5. Apparatus for treatment of waste water characterized by a treatment vessel containing particulate material according to claim 1, one or more gasifiers disposed in a lower region of the treatment vessel, and means for supplying gas to the gasifiers for emission as gas bubbles to gasify the particulate material and the waste water.

6. A particulate material according to claim 1, wherein the plastics material comprises polyethylene.

7. A particulate material according to claim 1, wherein the substantially inert material comprises sand.

8. A waste water treatment method characterized by the steps of:

a) charging a treatment vessel with waste water and particulate material comprising solid granules of plastics material, each solid granule having a plurality of grains of a substantially inert material coated thereon to provide a habitat for microorganisms effective in waste water treatment, said solid granules having a predetermined particle size range, and said grains having a predetermined particle size range and being disposed at a predetermined packing density range on the granules, the particulate matter having an average density of approximately 1.0 g/cc such that about 50% of the particles tend to float at the surface of a body of waste water to be treated and about 50% tend to sink upon initial charging and when the body of waste water is at rest; and b) gasifying the waste water an particulate material by means of gas bubbles emitted from one or more gasifiers disposed in a lower region of the treatment vessel.

\* \* \* \* \*